(12) United States Patent
Andersen et al.

(10) Patent No.: US 7,323,030 B2
(45) Date of Patent: Jan. 29, 2008

(54) APPARATUS AND METHOD FOR AN EXHAUST AFTERTREATMENT DEVICE

(75) Inventors: Eric Hans Andersen, Grand Blanc, MI (US); Ricky Paul Schacher, Flint, MI (US); Alan Gerard Turek, Mayville, MI (US)

(73) Assignee: Delphi Technologies, Inc., Troy, MI (US)

( * ) Notice: Subject to any disclaimer, the term of this patent is extended or adjusted under 35 U.S.C. 154(b) by 327 days.

(21) Appl. No.: 10/975,896

(22) Filed: Oct. 28, 2004

(65) Prior Publication Data

US 2006/0096262 A1    May 11, 2006

(51) Int. Cl.
*B01D 46/00* (2006.01)
*B01D 35/30* (2006.01)

(52) U.S. Cl. ............... 55/502; 55/282.3; 55/385.3; 55/503; 55/523; 55/524; 55/DIG. 5; 55/DIG. 10; 55/DIG. 30; 60/297; 60/299; 60/300; 60/303; 60/311; 422/168; 422/177

(58) Field of Classification Search ............... 55/282.2, 55/282.3, 385.3, 502, 503, 523, 524, DIG. 5, 55/DIG. 10, DIG. 30; 60/297, 300, 299, 60/303, 311; 422/168, 177, 179
See application file for complete search history.

(56) References Cited

U.S. PATENT DOCUMENTS

| | | | |
|---|---|---|---|
| 4,444,721 A * | 4/1984 | Ohkata | 422/179 |
| 4,683,010 A | 7/1987 | Hartmann | |
| 4,951,954 A | 8/1990 | MacNeill | |
| 5,082,297 A | 1/1992 | Flasher | |
| 5,408,828 A * | 4/1995 | Kreucher et al. | 60/299 |
| 5,449,500 A | 9/1995 | Zettel | |
| 5,782,089 A * | 7/1998 | Machida et al. | 60/299 |
| 6,017,498 A | 1/2000 | Harding | |
| 6,116,022 A * | 9/2000 | Woodward | 60/300 |
| 6,533,289 B2 | 3/2003 | Bono, Jr. et al. | |
| 6,533,977 B1 | 3/2003 | Zettel et al. | |
| 6,613,296 B1 * | 9/2003 | Myers et al. | 422/179 |
| 6,923,942 B1 * | 8/2005 | Shirk et al. | 422/179 |
| 7,093,431 B2 * | 8/2006 | Balle et al. | 60/299 |
| 2005/0036923 A1 * | 2/2005 | Brisbin et al. | 422/179 |

FOREIGN PATENT DOCUMENTS

| | | |
|---|---|---|
| DE | 40 09 945 A1 * | 10/1991 |
| EP | 0 450 348 | 10/1991 |
| EP | 0 450 348 A1 * | 10/1991 |

(Continued)

OTHER PUBLICATIONS

European Search Report dated Dec. 1, 2005.

*Primary Examiner*—Jason M. Greene
(74) *Attorney, Agent, or Firm*—Paul L. Marshall

(57) ABSTRACT

An internally insulated exhaust aftertreatment device with a converter body, an end cone assembly and a sealing device inserted in an annular area between the external shell and the substrate of the converter body. The sealing device is sealingly engaged between an inner end cone and the insulating material. The sealing device comprises a wire-mesh ring-shaped device conformable to the annulus between the substrate and the shell, and may have a substantially round cross-sectional area, a C-shaped cross-sectional area, or an L-shaped cross-sectional area.

10 Claims, 2 Drawing Sheets

FOREIGN PATENT DOCUMENTS

| | | |
|---|---|---|
| EP | 0 693 616 | 1/1996 |
| EP | 0 693 616 A1 * | 1/1996 |
| EP | 1 149 992 | 10/2001 |
| EP | 1 149 992 A1 * | 10/2001 |
| JP | 2000-265830 * | 9/2000 |
| WO | 98/50688 | 11/1998 |
| WO | WO 98/50688 * | 11/1998 |

* cited by examiner

APPARATUS AND METHOD FOR AN EXHAUST AFTERTREATMENT DEVICE

TECHNICAL FIELD

This invention pertains generally to exhaust aftertreatment systems, and more specifically to an apparatus and method for sealing within the exhaust aftertreatment device.

BACKGROUND OF THE INVENTION

An internal combustion engine, such as for a motor vehicle, is generally required to have some form of exhaust aftertreatment device to combust and/or reduce pollutants created during the combustion process, prior to their escape into atmosphere. A typical exhaust aftertreatment device, also referred to as a catalytic converter, operates to store, reduce and/or oxidize pollutants as they pass through, prior to expelling them into the atmosphere. The typical catalytic converter comprises a coated ceramic or metallic substrate contained within a metallic structure, which is integrated into an exhaust system. A catalytic converter is generally larger in diameter than the exhaust system into which it is placed. Therefore, the catalytic converter typically includes flow transition devices, often referred to as end cones. One type of catalytic converter, referred to as an internally insulated catalytic converter, employs a pair of coaxial end cones on each end of the catalytic converter. An outer circumference of a face of an external end cone is welded to a face of the metallic structure of the catalytic converter, whereas a corresponding face of an internal end cone interfaces with insulating material in an annular space between the metallic structure and the substrate. A space is created between the inner end cone and the outer end cone which may be filled with insulating material or ambient air.

A typical substrate is wrapped in insulating material along its longitudinal circumference and inserted into the metallic structure. The insulating material structurally supports for the substrate, provides vibrational damping by decoupling the substrate from the metallic structure and the exhaust system, and provides a gaseous seal between the substrate and the metallic structure such that substantially all exhaust gases flow through passageways within the substrate.

A typical substrate includes a plurality of flow channels which pass longitudinally therethrough, for passing of exhaust gases therethrough. Substrates are characterized by the number of flow channels, or cells, they contain in a facial area of the substrate, e.g. cells per square inch, and by thickness of the substrate wall between each of the cells, e.g. 4 mil or 6.5 mill.

Under normal operation of an internal combustion engine, a small amount of the insulating material supporting the substrate may erode, or attrit over the service lifetime of the catalytic converter. The volume of eroded insulating material is insubstantial over the life of the converter, and typically passes through the substrate cells.

However, engine and vehicle manufacturers are requiring substrates with higher cell densities and thinner walls between cells, to help meet more stringent emissions regulations and to allow more efficient packaging of the converter. Substrates with higher cell densities and thinner walls are less able to pass the eroded insulating material, resulting in eroded insulating material building up on the leading face of the substrate. This may cause increased exhaust flow restriction, resulting in reduced engine power and other related engine and vehicle problems well known to one skilled in the art. The problem of exhaust flow restriction may be further exacerbated by deposition of oil, fuel and other residuals of the combustion process accumulating on the eroded insulating material. Therefore, what is needed is a device and method to prevent erosion of the insulating material during the service life of the converter, over ongoing operation of the engine. Such a device needs to be operable to withstand sustained exposure to extreme temperatures and flows occurring during useful life of the converter. It is also preferable that such a device and method meets the above-mentioned needs without requiring changes to existing designs, and tools and processes used to manufacture converters.

SUMMARY OF THE INVENTION

The present invention provides an improvement over conventional catalytic converter assemblies in that it provides an exhaust aftertreatment device with a converter body, an end cone assembly and a sealing device inserted in an annular area between the external shell and the substrate of the converter body. The sealing device is sealingly engaged between an inner end cone and the insulating material.

Furthermore, the sealing device comprises a wire-mesh ring-shaped device conformable to the annulus between substrate and the shell.

In another aspect of the invention, the sealing device may have a substantially round cross-sectional area, a C-shaped cross-sectional area, or an L-shaped cross-sectional area.

In another aspect of the invention, the cross-sectional area of the sealing device is deformed by a front edge skirt of an inner end cone upon assembly.

In another aspect of the invention, a method for assembling an exhaust aftertreatment device is detailed, comprising assembling a converter body by inserting a substrate, assembling an end cone assembly comprising an inner end cone and an outer end cone, and inserting the sealing device in an annular area between the external shell and the substrate. The end cones are assembled onto ends of the assembled converter body such that the sealing device is substantially sealingly engaged between the inner end cone and the insulating material. These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
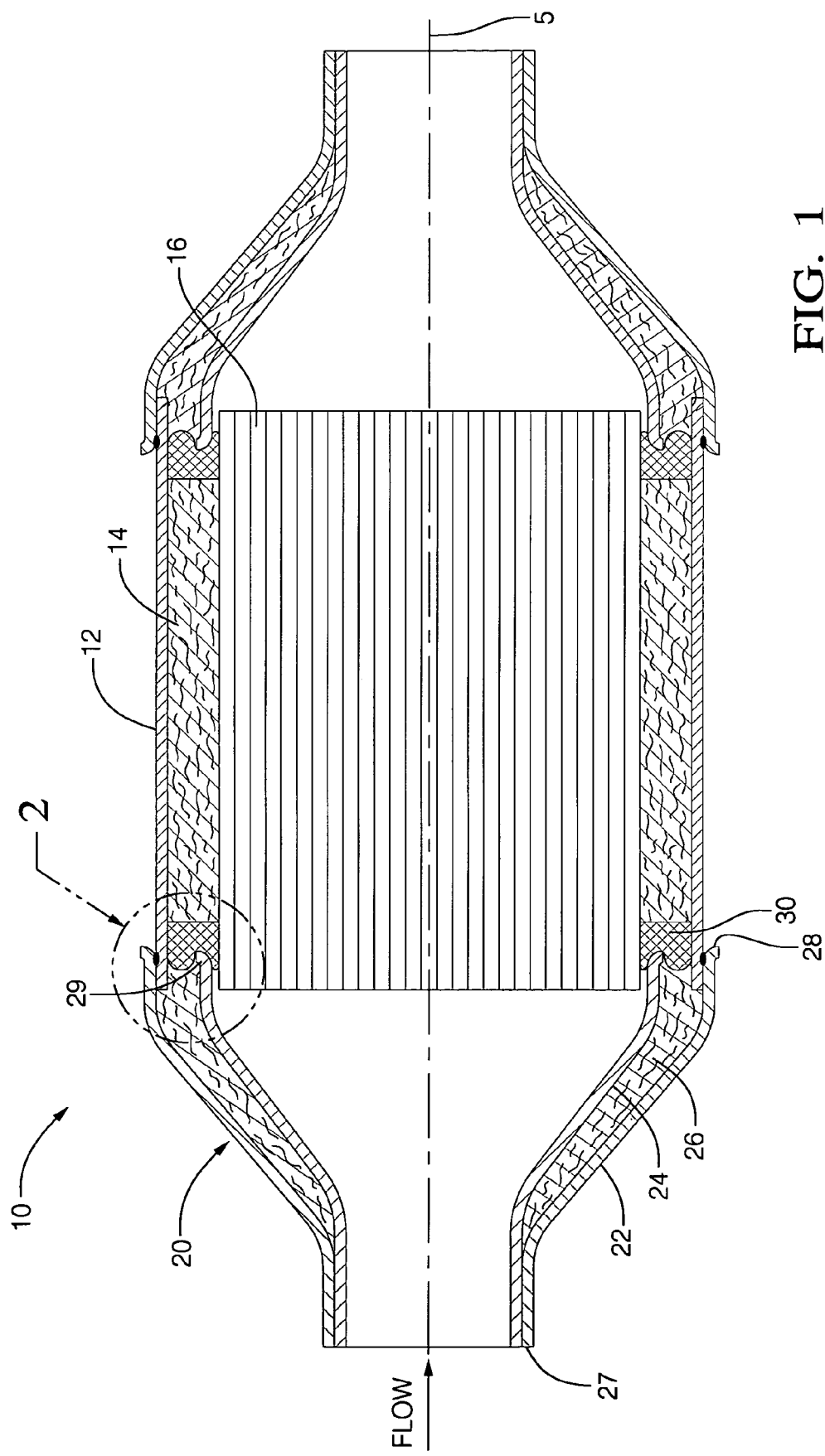
FIG. 1 is a schematic diagram, in accordance with the present invention.

Referring now to the drawings, wherein the showings are for the purpose of illustrating the invention only and not for the purpose of limiting the same, FIG. 1 shows a schematic drawing of an internally insulated catalytic converter 10 which has been constructed in accordance with an embodiment of the present invention. The exemplary catalytic converter 10 includes a converter body with an end cone assembly 20 on each end thereof. The converter body of this embodiment is referred to as a 'stuffed' converter, and comprises a tube-shaped metallic shell 12, into which a substrate 16 is forcefully inserted. The substrate 16 is wrapped in an insulating material 14 on its outer longitudinal circumference. The insulating material serves to provide structural support, vibrational damping, and thermal isolation for the substrate 16. Each end cone assembly 20 comprises a metallic outer end cone 22, a metallic inner end cone 24, and thermal insulating material 26. The outer end cone 22 and inner end cone 24 are coaxial to a longitudinal axis 5 of the catalytic converter 10, with a first end 27 thereof having a cross-sectional shape conforming to the shape of the exhaust pipe into which the converter 10 is assembled, for proper assembly. A second end 28 of the outer end cone 22 and inner end cone 24 is formed to conform to the cross-sectional shape of the converter shell 12 and substrate 16. The second end of outer end cone 22 is shaped to interferingly fit over an external surface of the converter shell 12. The second end of, outer end cone 22 is sealingly welded thereto, preferably using a MIG edge weld, which is known to one skilled in the art. The second end of inner end cone 24 is shaped to fit between substrate 16 and converter shell 12. In this invention, a sealing device 30 is inserted in an annular area created between an outer circumference of the substrate 16 and an inner circumference of the converter shell 12, across a face of the insulating material 14, immediately adjacent thereto. In this embodiment, the sealing device 30 is shown on each end of the converter shell 12. Alternate embodiments may use the sealing device 30 only on the forward face of the converter shell 12. When the end cone assembly 20 is assembled onto the body of the converter 12, the sealing device engages between a forward edge skirt 29 of the inner end cone 24 and the face of the insulating material 14, substantially completely sealing the insulating material 14 from exposure to flow of exhaust gases passing through the catalytic converter 10, and erosion associated therewith.

Substrate 16 is preferably an extruded ceramic device treated with one or more coatings containing platinum-group metals and other metals and elements suitable for storing, oxidizing, and/or reducing exhaust pollutants. Typical high-cell density substrates towards which this invention is directed are characterized as having 900 cells per square inch across the frontal area with walls that are 2 mils thick, or 600 cells per square inch across the frontal area with walls that are 3.5 mils thick. Substrate characteristics such as cell density, wall thickness, size, volume, cross-sectional shape and area, length are all selected based upon design criteria material to the proper operation and packaging of the catalytic converter 10 in the specific system, and are known to one skilled in the art.

Figure 2:
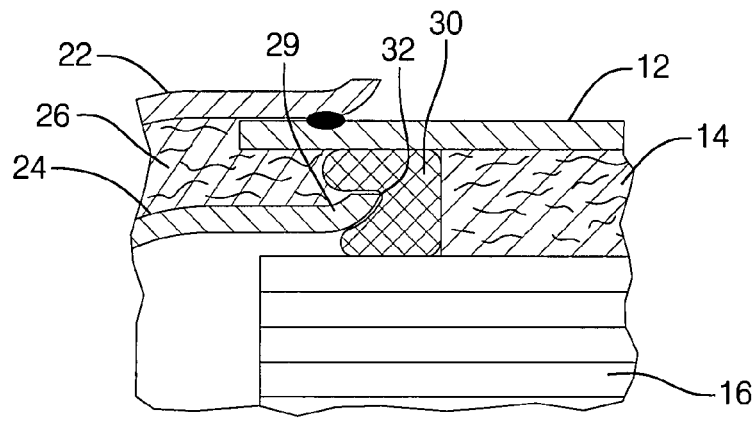
FIG. 2 is a more detailed schematic diagram of an embodiment of the invention.

The seal 30 is preferably a ring-shaped device conformable to the annulus between the substrate 16 and the shell 12. In the embodiment shown in FIG. 2, the cross-sectional area of seal 30 is formed in a C-shape, with a depressed area 32 of the seal which allows the forward edge skirt 29 of the inner end cone 24 to be embedded therein as part of the assembly process.

The seal 30 is preferably a substantially wire-mesh seal formed accordingly. In this embodiment, the seal is preferably created from knitted various 300-series stainless steel wire of small diameter (about 0.11 mm diameter). The wire, preferably drawn from spools comprising round and flattened cross-sections, is knitted into a tube shape. A specified length or section of the knitted tube-shaped stainless steel wire is folded or rolled onto itself to form a ring. The ring is placed into a compression die, and formed into a shape conforming to the annular area created between the outer circumference of the substrate 16 and the inner circumference of the converter shell 12, across the face of the insulating material 14. It has a cross-section as described and shown with reference to FIGS. 2, 3, and 4. Knitting of stainless steel wire, rolling and forming the resultant tube into a seal of known shape and cross-section is known to one skilled in the art.

The stainless steel wire material used to form the seal 30 may be supplemented by other materials with properties that are useful for maintaining shape of the seal, durability, optimizing heat transfer, and minimizing leakage past the seal during in-use conditions. These materials include, but are not limited to glass fiber, vermiculite, ceramic fibers, and graphite.

Figure 3:
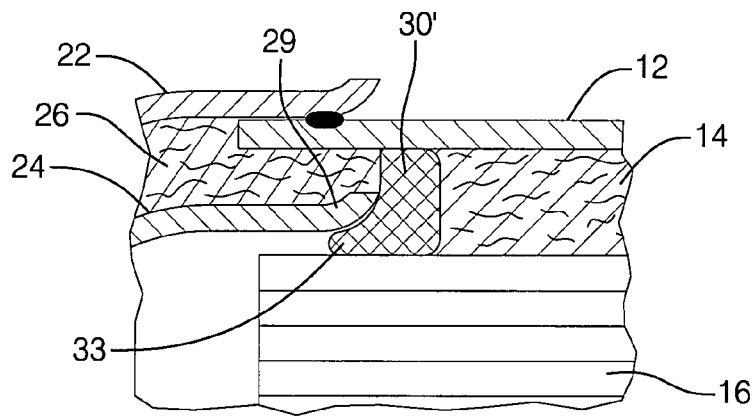
FIG. 3 is a more detailed schematic diagram of an embodiment of the invention; and, FIG. 4 is a more detailed schematic diagram of an embodiment of the invention.

In the alternate embodiment shown in FIG. 3, the cross-sectional area of seal 30 is formed in an L-shape, with lower leg 33 of the seal 30' protruding between outer surface of the substrate 16 and the forward edge skirt 29 of the inner end cone 24.

Figure 4:
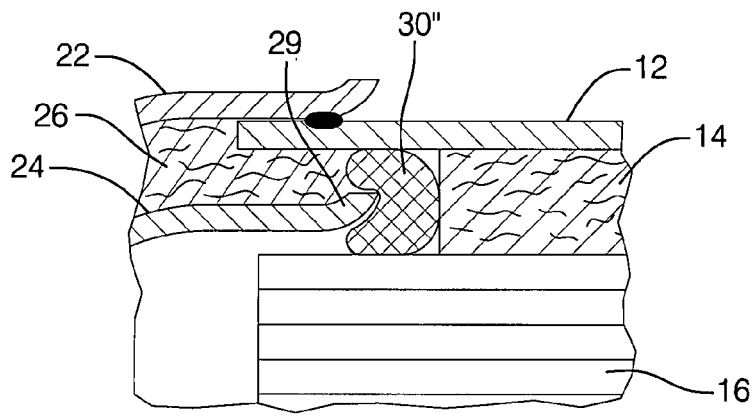

In the alternate embodiment shown in FIG. 4, the initial cross-sectional area of seal 30" is formed as a round shape. During assembly, the forward edge skirt 29 of inner end cone 24 is forcibly pressed into seal 30, which deforms to accommodate the forced intrusion.

In a typical assembly process of a catalytic converter, the substrate 16 circumferentially wrapped in insulating material 14 is inserted into the metallic shell 12, such that frontal face of the substrate 16 is exposed in a flowpath that runs longitudinal to the axis 5 of the converter 10. The end cone assembly is preassembled by aligning the first ends 27 of the coaxially-placed inner end cone 24 and outer end cone 22 with insulation material 26 therebetween, and spot-welding or dimpling a common point in the first ends 27. The seal 30 is placed in the annular area between the substrate 16 and shell 12, immediately adjacent the insulating material 14. A seal is preferably placed in the annular area on each end of the converter body 12. An end cone assembly 20 is positioned upon each longitudinal end of the converter body 12, and axially aligned to fit the cross-sectional shape. Compressive force is applied to each first end 27 of the end cone assemblies 20, causing the front edge skirts 29 of the inner end cones 24 to interferingly fit with the seal device 30, effectively creating a seal therein. The outer end cones 22 overlap the converter body 16. An edge MIG weld is applied completely around the circumference of each outer end cone wherein it overlaps with the converter body 12 to create an airtight seal.

Although this invention is described with respect to a stuffed-type converter assembly, it is understood that alternate embodiments of this invention can include a other converter assembly techniques with internally insulated end cones, including for example, clamshell, tourniquet, spin-form methods. Furthermore, one of the end cone assemblies may be replaced with an outlet of an exhaust manifold having the same features as the front edge skirt 29 of the inner end cone 24 previously described, thus operable to employ the seal device 30. The invention also encompasses any such design that uses only a single seal device 30 preferably placed on a leading face of the converter body 12, i.e. at end 28. The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. An exhaust aftertreatment device, comprising:
    a converter body, including an external shell containing a substrate substantially completely wrapped in an insulating material;
    an end cone assembly coaxially disposed with the longitudinal axis of said converter body, said end cone assembly including an inner end cone and an outer end cone; and,
    a resilient wire mesh seal, inserted in an annular area radially intermediate the external shell and the substrate immediately axially adjacent the insulating material;
    wherein the wire mesh seal is substantially sealingly engaged between the inner end cone and the insulating material, and said inner end cone is configured to form an interference fit with and to locally deform said wire mesh seal wherein a portion of said wire mesh seal extrudes axially between the inner end core and the substrate.

2. The exhaust aftertreatment device of claim 1, wherein the wire mesh seal comprises a ring-shaped device radially conformable to the annulus between the substrate and the shell.

3. The exhaust aftertreatment device of claim 1, wherein the wire mesh seal has a substantially round cross-sectional area.

4. The exhaust aftertreatment device of claim 1, wherein the wire mesh seal is operable to substantially completely seal the insulating material from exposure to flow of exhaust gases.

5. The exhaust aftertreatment device of claim 4, wherein the substrate is a high cell-density substrate.

6. The exhaust aftertreatment device of claim 1, wherein the wire mesh seal has a substantially C-shaped cross-sectional area.

7. The exhaust aftertreatment device of claim 1, wherein the wire mesh seal has a substantially L-shaped cross-sectional area.

8. A method for assembling an exhaust aftertreatment device, comprising:
    assembling a converter body by inserting a substrate substantially completely wrapped in an insulating material within an external shell;
    assembling an end cone assembly comprising an inner end cone and an outer end cone;
    inserting a resilient wire mesh seal in an annular area between the external shell and the substrate on at least one end of the converter body; and,
    assembling the end cones onto ends of the assembled converter body such that the wire mesh seal is substantially sealingly engaged between the inner end cone and the insulating material by an interference fit therebetween affecting localized axial deformation of a portion of said wire mesh seal between the substrate and the inner end cone.

9. An exhaust aftertreatment device comprising:
    a converter body including a tube-shaped metallic shell, a catalyst substrate disposed within the shell and a mat of fibrous thermal insulating material compressively disposed between the inner peripheral surface of the shell and the outer peripheral surface of the catalyst substrate;
    an inlet end cone assembly including an outer metallic end cone, an inner metallic end cone and fibrous thermal insulating material compressively disposed therebetween, said inlet end cone assembly coaxially disposed with the longitudinal axis of said converter body,
    wherein said outer end cone has a reduced diameter inlet and an outlet having a cross-sectional shape conforming with the metallic shell of the converter body for sealing engagement therewith, and wherein said inner end cone has a reduced diameter inlet sealingly affixed to the outer cone inlet and an outlet extending axially within said converter body radially intermediate the inner peripheral surface of said shell and the outer peripheral surface of said catalyst substrate, said inner cone outlet defining an axially directed skirt edge terminus circumscribing said catalyst substrate; and
    a resilient ring-shaped wire mesh seal compressively disposed within said converter body, conforming to the annulus between the inner peripheral surface of the shell and the outer peripheral surface of the catalyst substrate axially intermediate an upstream end of said mat and a downstream end of the end cone insulating material,
    wherein said inner cone skirt edge is configured to form an interference fit with and to locally deform said wire mesh seal, whereby a portion of said wire mesh seal extrudes axially between the inner end cone outlet and the outer peripheral surface of said catalytic substrate.

10. The exhaust aftertreatment device of claim 9, further comprising:
    an outlet end cone assembly including an outer metallic end cone, an inner metallic end cone and fibrous thermal insulating material compressively disposed therebetween, said outlet end cone assembly coaxially disposed with the longitudinal axis of said converter body longitudinally opposite said inlet end cone assembly,
    wherein the outer end cone of said outlet end cone assembly has a reduced diameter outlet and an inlet having a cross-sectional shape conforming with the metallic shell of the converter body for sealing engagement therewith, and wherein the inner end cone of said outlet end cone assembly has a reduced diameter outlet sealingly affixed to the outer cone outlet and an inlet extending axially within said converter body radially intermediate the inner peripheral surface of said shell and the outer peripheral surface of said catalyst substrate, said inner cone inlet defining an axially directed skirt edge terminus circumscribing said catalyst substrate; and
    a resilient ring-shaped wire mesh seal compressively disposed within said converter body, conforming to the annulus between the inner peripheral surface of the shell and the outer peripheral surface of the catalyst substrate axially intermediate an downstream end of said mat and a upstream end of the outlet end cone insulating material,
    wherein said inner cone skirt edge is configured to form an interference fit with and to locally deform said wire mesh seal, whereby a portion of said wire mesh seal extrudes axially between the inner end cone inlet and the outer peripheral surface of said catalytic substrate.

* * * * *